US009961696B2

(12) United States Patent
Wang

(10) Patent No.: US 9,961,696 B2
(45) Date of Patent: May 1, 2018

(54) SPECTRUM ANALYSIS AND OPERATION OF A DUAL RADIO DEVICE

(71) Applicant: QUALCOMM Incorporated, San Diego, CA (US)

(72) Inventor: Jibing Wang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 134 days.

(21) Appl. No.: 14/447,404

(22) Filed: Jul. 30, 2014

(65) Prior Publication Data

US 2016/0037544 A1 Feb. 4, 2016

(51) Int. Cl.
*H04W 72/12* (2009.01)
*H04W 88/06* (2009.01)

(52) U.S. Cl.
CPC ....... *H04W 72/1215* (2013.01); *H04W 88/06* (2013.01)

(58) Field of Classification Search
CPC . H04W 72/1215; H04W 88/06; H04W 24/10; H04M 15/58
See application file for complete search history.

(56) References Cited

U.S. PATENT DOCUMENTS

| 8,666,462 | B2 | 3/2014 | Rangarajan et al. |
|---|---|---|---|
| 2005/0059364 | A1 | 3/2005 | Hansen et al. |
| 2006/0082489 | A1 | 4/2006 | Liu et al. |
| 2007/0160020 | A1 | 7/2007 | Osann |
| 2010/0291921 | A1 | 11/2010 | Ruuska et al. |
| 2012/0034937 | A1 | 2/2012 | Cahill et al. |
| 2012/0040715 | A1* | 2/2012 | Fu ......................... H04B 1/1027 455/553.1 |

(Continued)

FOREIGN PATENT DOCUMENTS

WO WO-2013086659 A1 6/2013

OTHER PUBLICATIONS

ISA/EPO, International Search Report and Written Opinion of the International Searching Authority, Int'l App. No. PCT/US2015/041112, dated Oct. 21, 2015, European Patent Office, Rijswijk, NL, 12 pgs.

(Continued)

*Primary Examiner* — Redentor Pasia
*Assistant Examiner* — Peter Mak
(74) *Attorney, Agent, or Firm* — Holland & Hart LLP

(57) ABSTRACT

Methods, systems, and devices are described for wireless communications in which an unlicensed spectrum may be used for cellular communications (e.g., Long Term Evolution (LTE) communications). More particularly, the described features relate to improving resource management in a multi-radio or multi-modem wireless device by utilizing one radio or modem (e.g., a wireless local area network (WLAN) radio) to inform the operation of another radio or modem (e.g., an LTE radio) co-located on the wireless device. The monitoring radio (e.g., WLAN radio) may scan an unlicensed or shared spectrum for interfering signals (e.g., military, weather, etc.) transmitted on designated channels within the shared spectrum. Upon detection of the interfering signal, the monitoring radio may generate a spectrum analysis of the detected interference and inform the second radio (e.g., LTE radio) to modify its operation based on the spectrum analysis.

36 Claims, 11 Drawing Sheets

(56) References Cited

U.S. PATENT DOCUMENTS

| | | |
|---|---|---|
| 2012/0069766 A1 | 3/2012 | Fu et al. |
| 2012/0314598 A1 | 12/2012 | Sadek et al. |
| 2013/0272260 A1* | 10/2013 | Bitran .................. H04W 16/14 370/329 |
| 2013/0273949 A1* | 10/2013 | Linde ...................... H04B 1/40 455/501 |
| 2014/0227984 A1* | 8/2014 | Tran ...................... H04B 1/006 455/78 |
| 2015/0043363 A1* | 2/2015 | Koskinen ............. H04W 16/14 370/252 |
| 2015/0215471 A1* | 7/2015 | Ljung .................. H04M 15/58 455/405 |
| 2016/0014613 A1* | 1/2016 | Ponnampalam ...... H04W 16/18 370/254 |

OTHER PUBLICATIONS

IPEA/EP, Second Written Opinion of the International Preliminary Examining Authority, Int'l App. No. PCT/US2015/041112, dated Jul. 18, 2016, European Patent Office, Rijswijk, NL, 8 pgs.

* cited by examiner

SPECTRUM ANALYSIS AND OPERATION OF A DUAL RADIO DEVICE

BACKGROUND

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a base stations and access points (APs) that support communication for a number of wireless devices. The base stations of a cellular network may include a number of NodeBs (NBs) or evolved NodeBs (eNBs). The APs of a wireless local area network (WLAN) may include a number of WLAN APs, such as nodes operating according to the IEEE 802.11 family of standards (WiFi). Each base station and/or AP may support communication for a number of devices (e.g., user equipments (UEs)) and may often communicate with multiple devices at the same time. Similarly, each UE may communicate with a number of base stations and/or APs employing different access technologies.

As cellular networks become more congested, operators are beginning to look at ways to increase capacity. One approach may include the use of an unlicensed spectrum for wireless communication. Regulations often dictate, however, that a wireless device operating within an unlicensed bandwidth monitor the spectrum for prioritized use. Regulations may require that particular channels of an unlicensed spectrum be avoided. But constant spectrum monitoring may divert limited resources of a wireless device and degrade system performance. It may therefore be beneficial to efficiently manage the resources of a wireless device while complying with spectrum monitoring requirements.

SUMMARY

The described features generally relate to one or more improved systems, methods, and apparatuses for wireless communications in which an unlicensed spectrum may be used by devices employing wireless communications standards designed for licensed spectrum operation. More particularly, the described features relate to resource management and interference mitigation with a multi-radio or multi-modem wireless device by utilizing one radio or modem (e.g., a WLAN radio) to inform the operation of another radio or modem (e.g., a Long-Term Evolution (LTE) radio) co-located on the wireless device.

In a first set of illustrated examples, a method for wireless communication with a device comprising a first radio employing a first radio access technology (RAT) and a second radio employing a second RAT is disclosed. The method may comprise scanning a designated spectrum for interference during a first time period utilizing the first RAT. The designated spectrum may be shared by the first and second radios. The method may further comprise detecting an interference signal on the designated spectrum during the first time period and generating a spectrum analysis based at least in part on the detected interference signal. In some examples, the operation of the second radio during a second time period may be based at least in part on the generated spectrum analysis.

In some examples, the method may comprise receiving a signal with the second radio via an antenna shared by the first and second radios during the first time period. Additionally or alternatively, transmitting with the second radio in the designated spectrum during the second time period may be based on the generated spectrum analysis. For example, the method may comprise tuning the second radio to the avoid communicating on a channel of the designated spectrum during the second time period. In other examples, the method may include inhibiting transmission by the second radio on a channel of the designated spectrum during the second time period based on the generated spectrum analysis. Generating the spectrum analysis may further comprise sending the spectrum analysis from the first radio to the second utilizing a messaging interface.

In some examples, the spectrum analysis comprises determining the signal structure of the interfering signal, the signal structure comprising one or both of duty cycle and spatial signature. The first and second radios may share a low-noise amplifier and an antenna. In certain examples, the interfering signal may comprise at least one of a wireless local area network (WLAN) signal, a radar signal, or a Long-Term Evolution (LTE) signal. The designated spectrum may comprise an unlicensed spectrum band. Additionally or alternatively, the first radio may comprise a WLAN modem and the second radio may comprise a LTE modem operating in the designated spectrum.

In a second set of illustrated examples, an apparatus for wireless communication is disclosed. The apparatus may comprise a first radio employing a first radio access technology (RAT) and a second radio employing a second RAT. The apparatus may further comprise a bandwidth scanner to scan a designated spectrum for interference during the first time period utilizing the first RAT, wherein the designated spectrum is shared by the first and second radios. The apparatus may also comprise an interference detector to detect an interference signal on the designated spectrum during the first time period and a signal analyzer to generate a spectrum analysis based at least in part on the detected interference signal. The apparatus may further include a communication manager to operate the second radio during a second time period based at least in part on the generated spectrum analysis. In certain examples, the apparatus may implement one or more aspects of the method for wireless communications described above with respect to the first set of illustrative examples.

In a third set of illustrated examples, an apparatus for wireless communication is disclosed. The apparatus may comprise a first radio employing a first radio access technology (RAT) and a second radio employing a second RAT. The apparatus may further include means for scanning a designated spectrum for interference during a first time period utilizing the first RAT. The designated spectrum may be shared by the first and second radios. The method may further comprise means for detecting an interference signal on the designated spectrum during the first time period and means for generating a spectrum analysis based at least in part on the detected interference signal. In some examples, the apparatus may further include means for operating the second radio during a second time period may be based at least in part on the generated spectrum analysis. In certain examples, the apparatus may implement one or more aspects of the method for wireless communications described above with respect to the first set of illustrative examples.

In a fourth set of illustrated examples, a non-transitory computer-readable medium storing code for wireless communication with a device comprising a first radio employing a first RAT and a second radio employing a second RAT. The code may comprise instructions executable by a processor to scan a designated spectrum for interference during a first time period utilizing the first RAT. The designated spectrum may be shared by the first and second radios. The instructions executable by processors may further detect an interference signal on the designated spectrum during the first time period and generate a spectrum analysis based at least in part on the detected interference signal. In some examples, the instructions executable by a processor may operate the second radio during a second time period based at least in part on the generated spectrum analysis. In certain examples, the non-transitory computer-readable medium may implement one or more aspects of the method for wireless communications described above with respect to the first set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. In instances in which only the first reference label is used in the specification, the description is applicable to any one of the similar components having the same first reference label irrespective of the second reference label.

DETAILED DESCRIPTION

Figure 1:
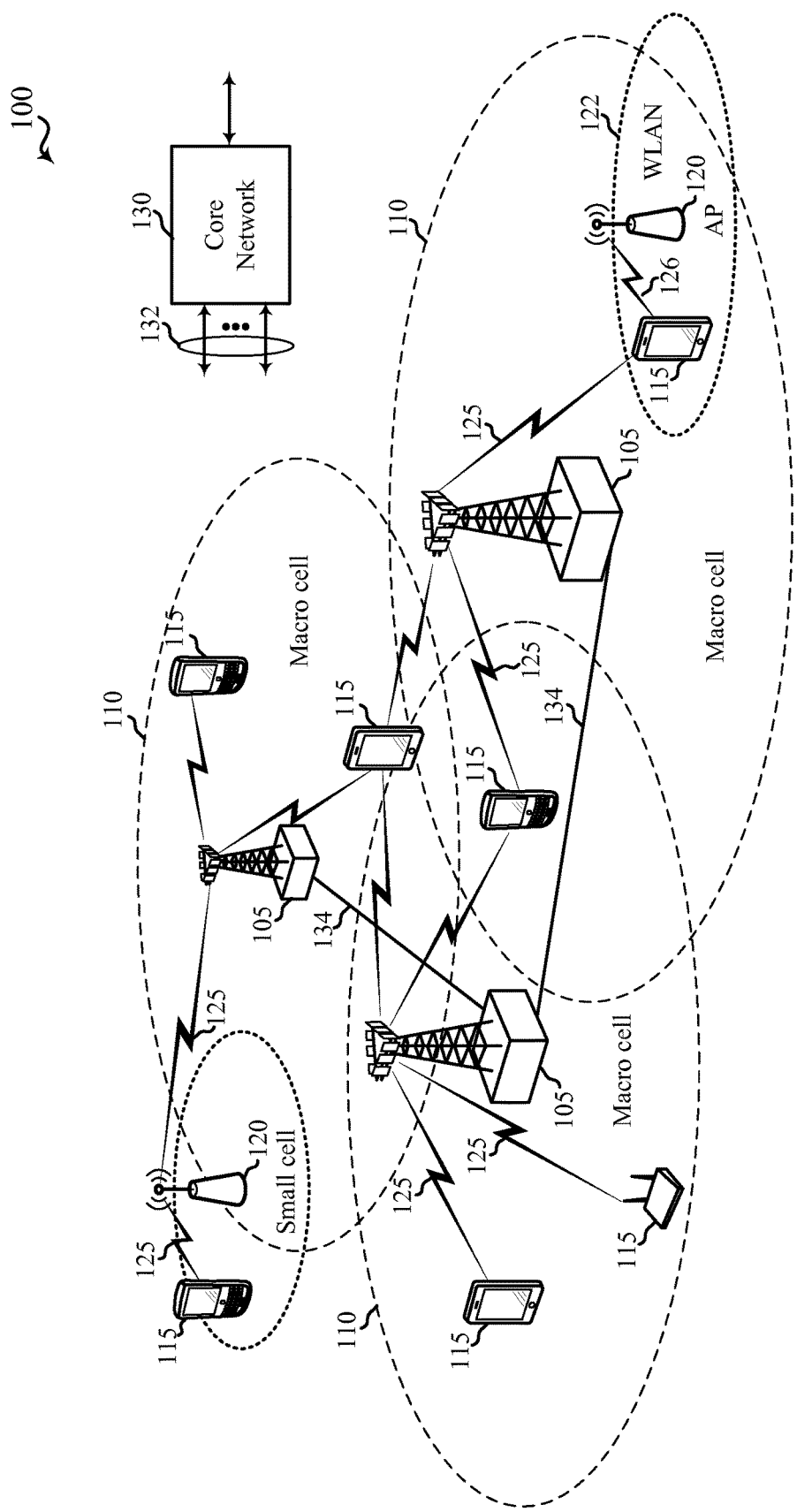
FIG. 1 shows a diagram that illustrates an example of a wireless communications system operating with a resource-managing multi-radio device.

A multi-radio device may operate with multiple radio access technologies (RATs) over a shared, unlicensed portion of wireless spectrum. WiFi has been a principle RAT employed for use with unlicensed spectrum. In some cases, WiFi may be utilized to relieve ever-increasing levels of congestion in cellular networks by offloading network traffic to these unlicensed bands. But a new RAT based on LTE in unlicensed spectrum may be utilized in addition or as an alternative to carrier-grade WiFi. LTE/LTE-Advanced (LTE-A) communications in unlicensed or shared spectrum may thus be utilized to relieve congestion for cellular (e.g., license spectrum) networks.

Broadly speaking, the unlicensed spectrum in some jurisdictions may range from 600 Megahertz (MHz) to 6 Gigahertz (GHz). As used herein, the term "unlicensed spectrum" or "shared spectrum" may thus refer to industrial, scientific and medical (ISM) radio bands, irrespective of the frequency of those bands. In some examples, unlicensed spectrum is the U-NII radio band, which may also be referred to as the 5 GHz or 5 G band. By contrast, the term "licensed spectrum" or "cellular spectrum" may be used herein to refer to wireless spectrum utilized by wireless network operators under administrative license from a governing agency.

LTE/LTE-A communications in an unlicensed or shared spectrum may leverage many LTE concepts and may introduce some modifications to physical layer (PHY) and media access control (MAC) aspects of the network or network devices, which may provide efficient device operation while meeting regulatory requirements. In some cases, LTE/LTE-A in an unlicensed or shared spectrum may perform significantly better than WiFi.

As network traffic increases, network operators (e.g., cellular service providers) may increasingly leverage unlicensed spectrum to enhance data transmission capacity. While LTE/LTE-A may be an attractive option for such offloading, the use of unlicensed spectrum may result in interfering signals from other devices also operating within the unlicensed spectrum. The devices and features described below may be utilized to efficiently detect and avoid such interference.

A wireless device may be equipped with both WLAN and LTE radios, and the device may utilize the WLAN radio to inform the operation of the LTE radio. For example, the WLAN radio may scan an unlicensed or shared spectrum for certain interfering signals (e.g., military communications, weather radar traffic, etc.) transmitted on the designated channels within the shared spectrum. The WLAN radio may thus be utilized to detect such signals and generate a spectrum analysis while the LTE radio is utilized for active communication. In some cases, the spectrum analysis generated by the WLAN radio may be utilized to inform operation of the LTE radio. For instance, the LTE radio may make subsequent transmissions and/or avoid certain channels based on the spectrum analysis.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring to FIG. 1, a diagram illustrates an example of a wireless communications system or network 100. The system 100 includes base stations (or cells) 105, WLAN access points (APs) 120, communication devices 115, and a core network 130. The base stations 105 may communicate with the communication devices 115 under the control of a base station controller (not shown), which may be part of the core network 130 or the base stations 105 in various embodiments. The base stations 105 may communicate control information and/or user data with the core network 130 through backhaul links 132. Similarly, WLAN APs 120 may communicate with communication device 115 using a bidirectional communication link 126. In some examples, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 and 126 may be a multi-carrier signal modulated according to the various radio technologies described herein. Each modulated signal may be sent on a different carrier and may carry control information (e.g., reference signals, control channels, etc.), overhead information, data, etc.

Each of the base stations 105 and/or APs 120 may provide communication coverage for a respective coverage area 110 and 122 respectively. In some examples, a base station 105 may be referred to as a base transceiver station (BTS), a radio base station, a radio transceiver, a basic service set (BSS), an extended service set (ESS), a NodeB, an evolved NodeB (eNB), a Home NodeB, a Home eNodeB. An access point 120 may be referred to as a WLAN AP, a WiFi node or some other suitable terminology. The coverage area 110 for the base stations 105 and access points 120 may be divided into sectors making up only a portion of the coverage area (not shown). The system 100 may include base station 105 of different types (e.g., macro, micro, and/or pico base stations). The access points 105 may also utilize different radio technologies, such as a cellular and/or WLAN radio access technologies. The access points 105 may be associated with the same or different access networks or operator deployments. In LTE/LTE-A communications systems, the term evolved NodeB or eNB may generally be used to describe the base stations 105.

In some examples, the system 100 may include an LTE/LTE-A communications system (or network) that supports modes of operation or deployment scenarios in an unlicensed or shared spectrum. In other embodiments, the system 100 may support concurrent wireless communications using both an unlicensed spectrum and an access technology different from LTE/LTE-A in a licensed, unlicensed or shared spectrum.

The system 100 may be a Heterogeneous LTE/LTE-A network in which different types of base stations 105 provide coverage for various geographical regions. For example, each base station 105 may provide communication coverage for a macro cell, a pico cell, a femto cell, and/or other types of cell. Small cells, such as pico cells, femto cells, and/or other types of cells, may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). In some examples, a small cell AP 120 may be configured with multiple radios employing different RATs, both on unlicensed spectrum. The small cell AP 120 may thus utilize one radio to scan for interference and, if interference is detected, to generate a spectrum analysis that may be used to inform operation of the other radio of the AP 120.

The core network 130 may communicate with the APs 105 via a backhaul link 132 (e.g., S1, etc.). The base stations 105 may also communicate with one another, e.g., directly or indirectly via backhaul links 134 (e.g., X2, etc.) and/or via backhaul links 132 (e.g., through core network 130). The wireless communications system 100 may support synchronous or asynchronous operation. For synchronous operation, the base stations 105 may have similar frame and/or gating timing, and transmissions from different access points may be approximately aligned in time. For asynchronous operation, the base stations 105 may have different frame and/or gating timing, and transmissions from different access points may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different access networks, such as cellular or other WWAN access networks, or WLAN access networks. Additionally or alternatively, a UE 115 may be configured with multiple radios of different RATs configured to operate within an unlicensed or shared spectrum.

The communication links 125 shown in system 100 may include uplink (UL) transmissions from a mobile device 115 to an access point 105, and/or downlink (DL) transmissions, from an access point 105 to a mobile device 115. The downlink transmissions may also be called forward link transmissions while the uplink transmissions may also be called reverse link transmissions. The downlink transmissions may be made using a licensed spectrum (e.g., LTE), LTE/LTE-A in an unlicensed or shared spectrum, or both. Similarly, the uplink transmissions may be made using a licensed spectrum (e.g., LTE), LTE/LTE-A in an unlicensed or shared spectrum, or both. When the wireless device or station 115 in system 100 communicates with a WLAN or WiFi network, communication links 126 may include uplink and downlink transmission between the UE 115 and an AP 120 providing communication coverage for a respective geographic area 122. The UEs 115 may thus concurrently communicate with an LTE network and with a WiFi network.

In some examples of the system 100, various deployment scenarios for LTE/LTE-A in an unlicensed or shared spectrum may be supported. Transmissions between a UE 115 and a network device using an unlicensed spectrum may be carried out by using one or more carrier frequencies in a frequency band. A frequency band, for example, may be divided into multiple carrier frequencies, and each carrier frequency may have the same bandwidth or different bandwidth. For example, each carrier frequency may occupy 20 MHz of a 5 GHz frequency band.

In many deployments, a UE 115 and/or base station 105 seeking to transmit using unlicensed spectrum may be required to verify that the spectrum is available for use in such a transmission. In some examples, the verification may include checking that the desired spectrum is not otherwise occupied (e.g., utilized by a higher priority signal) prior to initiating transmissions. But even in situations where the UE 115 or base station 105 has successfully verified the availability of the unlicensed spectrum at the time of initiating transmission, periodic interference may still be encountered. For instance, another device in the network (e.g., military or weather radar device) may begin to transmit in the shared spectrum during the same time period.

In a multi-radio base station 105 or UE 115, one radio may be used to scan for, and may thus detect the presence of such interference in the unlicensed or shared spectrum. Upon detecting the interference, the base station 105 or UE 115 may perform interference cancelation or avoidance techniques as discussed below with reference to FIGS. 2-9.

Figure 2:
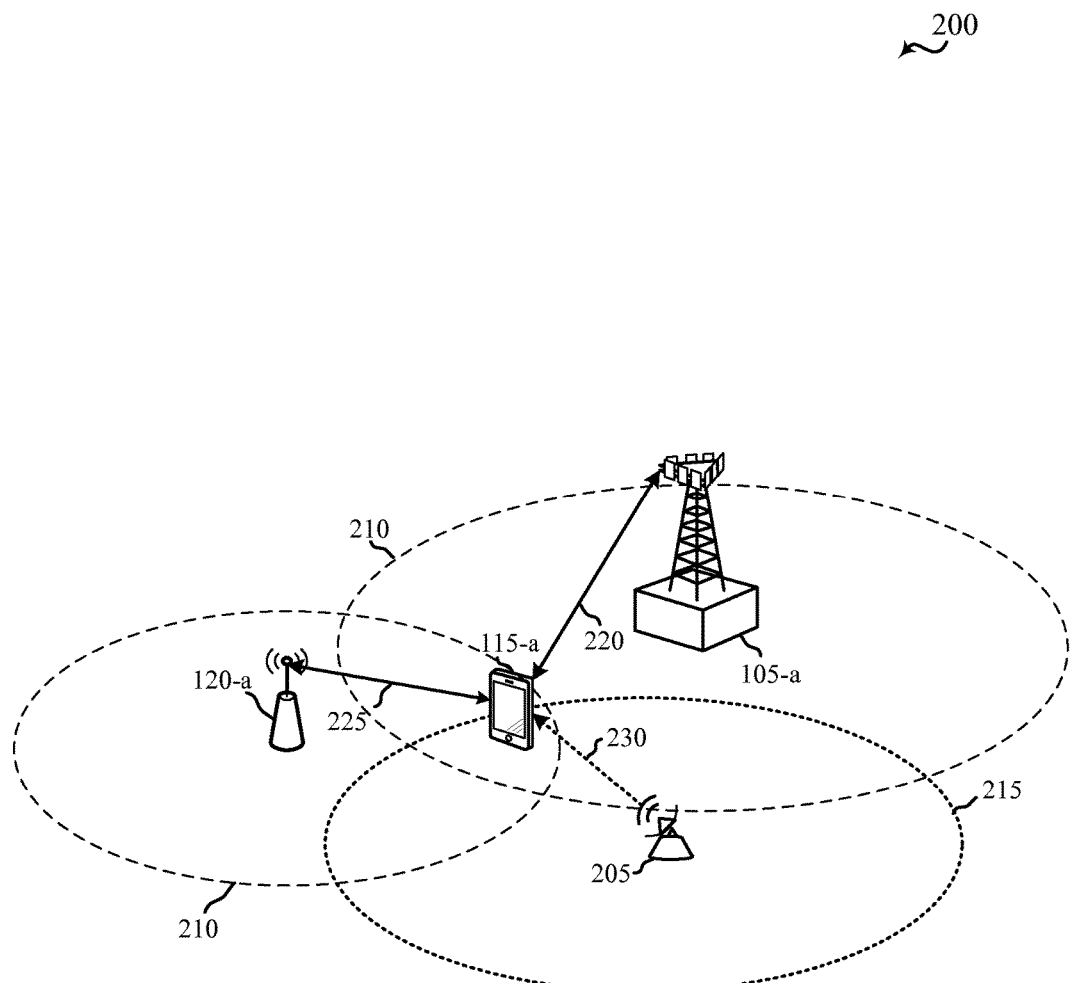
FIG. 2 shows a diagram that illustrates an example of a wireless communications system operating with a resource-managing multi-radio device.

FIG. 2 shows a diagram that illustrates an example of a wireless communications system 200 operating with a resource-managing multi-radio device. The system 200 may be an example of portions of the system 100 described with reference to FIG. 1. System 200 includes an eNBs 105-a, a UE 115-a, and an AP 120-a, which may be examples of corresponding devices described with reference to FIG. 1. The eNBs 105-a may communicate with UE 115-a using bidirectional link 220. Similarly, a small cell AP 120-a may communicate with UE 115-a using bidirectional link 225. Each of the eNB 105-a and AP 120-a may have a corresponding coverage area 210. According to some embodiments, bidirectional links 220 and 225 may be transmitted using licensed spectrum, unlicensed/shared spectrum, or a combination of both.

As mentioned above, transmissions in the unlicensed spectrum may be required to employ a contention-based protocol, such as a Listen Before Talk (LBT) protocol based on the LBT protocol specified in ETSI (EN 301 893). When using a gating interval that defines the application of an LBT protocol, the gating interval may indicate a listening interval during which a transmitting device may be expected to perform a Clear Channel Assessment (CCA). The outcome of the CCA may indicate to the transmitting device (e.g., UE 115-a) whether a channel of the unlicensed spectrum is available or in use. When the CCA indicates that the channel is available (e.g., "clear" for use), the gating interval may allow the transmitting device to use the channel—e.g., for a predefined transmission period. When the CCA indicates that the channel is not available (e.g., in use or reserved), the gating interval may prevent the transmitting device from using the channel during the transmission period. In other examples, different contention-based protocols may be used, such as carrier sense multiple access (CSMA) protocol with collision detection, for example.

A radar-emitting device or radar node 205 may have corresponding coverage area 215, and may transmit radar signals 230. The radar signals 230 may be transmitted over channels of the unlicensed/shared spectrum utilized for bidirectional links 220 and 225. The radar signals 230 may thus be interfering signals for UE 115-a. In some situations, even though eNB 105-a and UE 115-a may have successfully performed a CCA for access to the unlicensed spectrum, a radar node 205 may transmit an interfering signal (e.g., a radar signal 230) concurrently with transmissions from eNB 105-a or UE 115-in the unlicensed or shared spectrum. For example, a radar node 205 may start transmitting after the CCA has been completed. Such interference may significantly degrade the forward error rate for LTE/LTE-A communications in an unlicensed or shared spectrum and reduce throughput. Additionally, under some regulatory regimes, radar signals 230 constitute priority uses of the unlicensed/shared spectrum. The UE 115-a, eNB 105-a, and/or AP 120 may therefore be obligated to avoid transmissions on channels utilized for the radar signals 230

In order to avoid the radar signals 230, one radio of the UE 115-a may be used to scan channels of the unlicensed or shared spectrum, while a second radio of the UE 115-a is used to receive transmission via bidirectional link 220. The UE 115-a may be equipped with a WLAN radio and an LTE radio, and it may utilize the WLAN radio to scan a spectrum, while concurrently receiving data (e.g., receiving during the same time period) via the LTE radio. The WLAN radio may detect the radar signals 230, and may generate a spectrum analysis. The UE 115-a may then operate the LTE radio based on the spectrum analysis performed by the WLAN radio, which may include re-tuning the LTE radio to avoid the radar signals 230. Or, the UE 115-a may transmit, during a subsequent time period, with the LTE radio on a channel that avoids the radar signals 230. Alternatively, the UE 115-a may inhibit transmissions by the LTE radio on utilized by the radar signals 230.

While interference in this example is described from a radar node 205, other uses of the unlicensed or shared spectrum may also constitute interference. For instance, WLAN (e.g., WiFi) or LTE signals transmitted by other devices in the network on the unlicensed spectrum may also constitute interference. In some examples, a signal from AP 120-a (e.g., via bidirectional link 225) may potentially interfere with communications between the eNB 105-a and the UE 115-a (e.g., via bidirectional link 220). In such cases, a scan by one radio of the UE115-a may detect interference via bidirectional link 220, and may thus generate a spectrum analysis, In some examples, the spectrum analysis includes a determination of signal structure of the interfering signal, which may include a duty cycle and/or a spatial signature of the interfering signal. The UE 115-a may operate a second radio of the UE 115-a based on the spectrum analysis.

Figure 3:
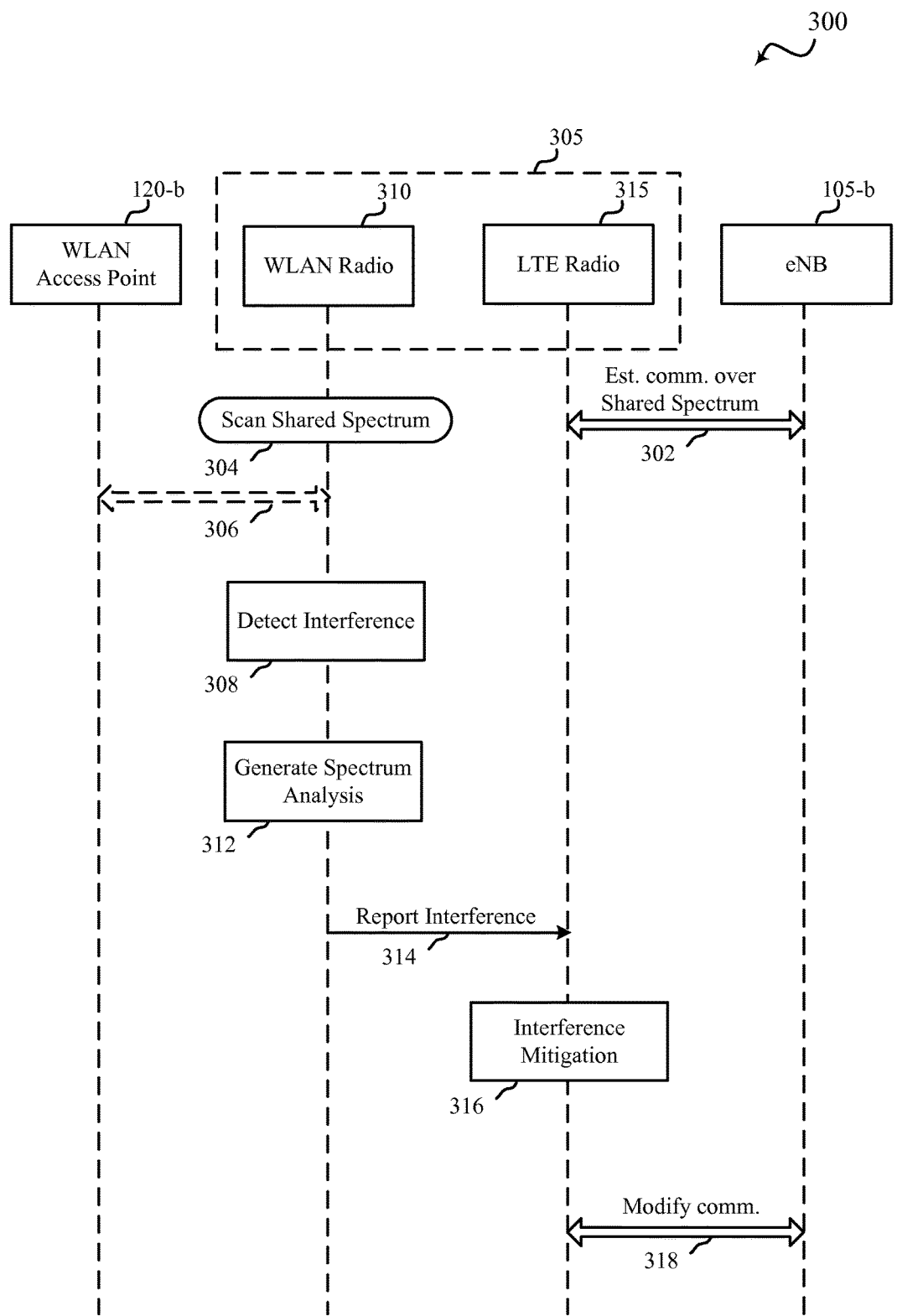
FIG. 3 shows a message flow diagram illustrating a flow of communication between a multi-radio device and other network devices, in accordance with the principles of the present disclosure.

FIG. 3 shows a message flow diagram 300 illustrating a flow of communication between a multi-radio device and other network devices. The device 305 may be an example of a UE 115 or AP 120 described with reference to FIGS. 1 and 2. Similarly, eNB 105-b and WLAN AP 120-b may be examples of various base stations 105 and APs 120 described with reference to FIGS. 1 and 2. In some examples, the device 305 may include a WLAN radio 310 and an LTE radio 315 co-located at the device 305 to establish communication with the network employing different radio access technologies (RATs).

In some examples, the LTE radio 315 may establish LTE/LTE-A communication 302 with an eNB 105-*b* utilizing an unlicensed or shared spectrum. Communication 302 may be established following a successful CCA determination for access to the unlicensed spectrum. It would be understood by those skilled in the art that performing CCA determination may not be a prerequisite to utilizing the unlicensed spectrum. In accordance with the examples of the present disclosure, the WLAN radio 310 may monitor the shared spectrum 304 for interference signals while the LTE radio 315 communicates with the eNB 105-*b* over the unlicensed or shared spectrum. In some examples, the WLAN radio 310 and LTE radio 315 may each operate within the same, or overlapping bandwidth(s).

As a result, the WLAN radio 310 may monitor the shared spectrum either continuously or periodically while the LTE radio 315 maintains active communication with the eNB 105-*b*. Additionally or alternatively, the WLAN radio 310 may also establish communication 306 with the WLAN access point 120-*b* during the same time period. Thus, WLAN radio 310 may be configured to actively monitor the shared spectrum 304 while alternatively communicating with the WLAN access point 120-*b* to maximize bandwidth usage. In some examples, the WLAN radio 310 may detect an interference signal 308 over the unlicensed or shared spectrum. The interference may be from a radar node, neighboring eNB, or AP utilizing the shared spectrum.

Upon detection of the interference signal 308 on the shared spectrum, the WLAN radio 310 may generate a spectrum analysis 312 of the detected signal. The spectrum analysis may include identifying specific channels that observed interference and/or determining the structure of the interfering signal. In one example, the signal structure may include the duty cycle and spatial signature (e.g., single or multiple spatial streams) of the interfering signal.

The WLAN radio 310 may transmit a message 314 to the LTE radio 315 to report the detected interference, and/or to interrupt transmissions by the LTE radio 315. In some examples, the transmitted message 314 includes the spectrum analysis generated by the WLAN radio 310. In response to the spectrum analysis, the LTE radio 315 may modify its operation 316 on the unlicensed spectrum to mitigate the effects of the interference. The modifications may, for example, include tuning 318 the LTE radio 315 to avoid communicating with the eNB 105-*b* on the channels identified by the WLAN radio 310 as being utilized by other signals. In some examples, the LTE radio 315 may dynamically switch its communication with the eNB 105-*b* from an unlicensed or shared spectrum to a licensed spectrum in order to maintain active connection between eNB 105-*b* and device 305. In other examples, the LTE radio 315 may inhibit transmission on the unlicensed or shared spectrum for a predetermined time period upon notification of the detected interference by the WLAN radio 310. In either case, the LTE radio 315 may delegate active monitoring of the unlicensed spectrum to the WLAN radio 310, while preserving limited resources of the LTE radio 315 to maximize throughput of LTE/LTE-A communications in the unlicensed or shared spectrum.

Figure 4:
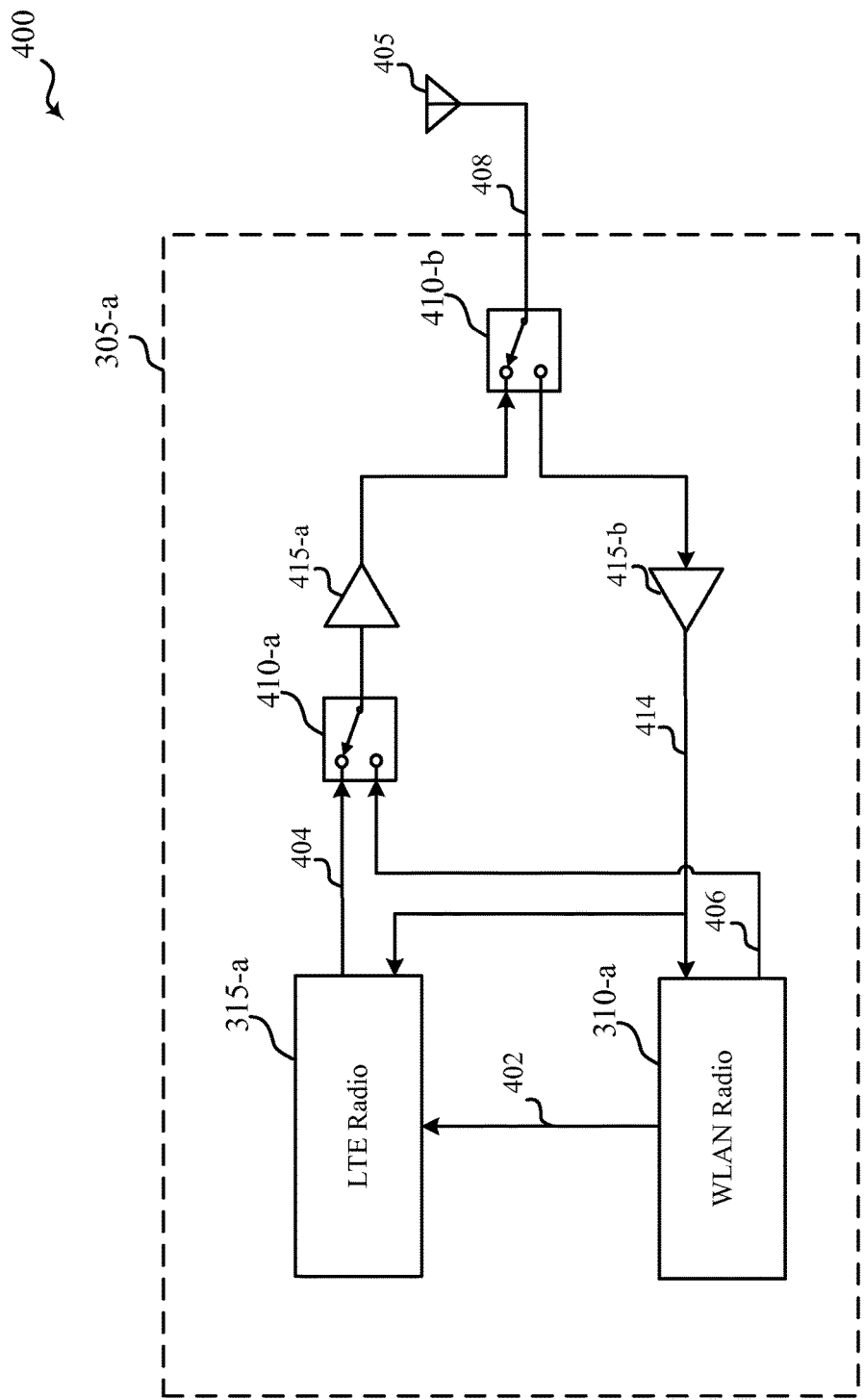
FIG. 4 shows a diagram of a UE that illustrates an example of a resource-managing multi-radio device.

Turning next to FIG. 4, a block diagram 400 of a device 305-*a* illustrates an example of a resource-managing multi-radio device. The device 305-*a* may illustrate aspects of the UEs 115 or APs 120 described with reference to FIGS. 1, 2 and/or 3. The device 305-*a* may include a WLAN radio 310-*a* and an LTE radio 315-*a*. The WLAN radio 310-*a* and the LTE radio 315-*a* may be an example of the WLAN radio 310 and LTE radio 315 described with reference to FIG. 3. The device 305-*a* may further include an antenna 405, a plurality of switches 410, and low-noise amplifiers 415.

In some examples, the WLAN radio 310-*a* and the LTE radio 315-*a* may share a common antenna 405 to establish communication with the network and/or other wireless devices. The device 305-*a* may configure switch 410-*b* to forward received signals 414 simultaneously to both the WLAN radio 310-*a* and the LTE radio 315-*a*. Alternatively, the device 115-*c* may trigger switch 410-*a* to alternate transmission of data packets 404 and 406 to the network between LTE radio 315-*a* and the WLAN radio 310-*a* via link 408.

In order to avoid the interference signals, the WLAN radio 310-*a* of device 305-*a* may be used to scan channels of the unlicensed or shared spectrum, while LTE radio 315-*a* is used to receive transmission via the network. In some examples, the WLAN radio 310-*a* is a 5 GHz radio (e.g., a WiFi radio), and the receiver path of the WLAN radio 310-*a* may be used to perform radar and interference detection on the unlicensed or shared spectrum. The use of WLAN radio 310-*a* receiver path may allow the WLAN radio 310-*a* to scan numerous channels on the shared spectrum, while allowing the LTE radio 315-*a* to preserve limited resources by avoiding use of the LTE radio for radar scanning and thus improving throughput of the LTE/LTE-A communications in the unlicensed or shared spectrum.

In some examples, the WLAN radio 305-*a*, upon detecting an interfering signal on at least one channel of the unlicensed or shared spectrum, may generate a spectrum analysis. The spectrum analysis may include identifying specific channels that observed interference and/or determining the structure of the interfering signal. The signal structure may include the duty cycle and spatial signature of the interfering signal. The duty cycle may, for instance, include a percentage of time of interference activity in the designated channels. Additionally or alternatively, the spatial signature may capture the rank (e.g., the number of spatial layers) of the interference in the designated frequency channel.

In some examples, the WLAN radio 310-*a* may transmit a message 402 to the LTE radio 315-*a* to report the detection of the interference signal. In one example, the WLAN radio 310-*a* may utilize Wireless Coexistence Interface (WCI-2) messaging interface to transmit spectrum analysis to the LTE radio 315-*a*. In response, the LTE radio 315-*a* may modify its operation on the unlicensed or shared spectrum to mitigate the effects of the interference, or to avoid a detected signal. The modifications may include either tuning the LTE radio 315-*a* to, e.g., avoid communicating with an eNB 105 (FIGS. 1-3) on the identified channels or ceasing transmission on the unlicensed spectrum for a predetermined time period.

Figure 5:
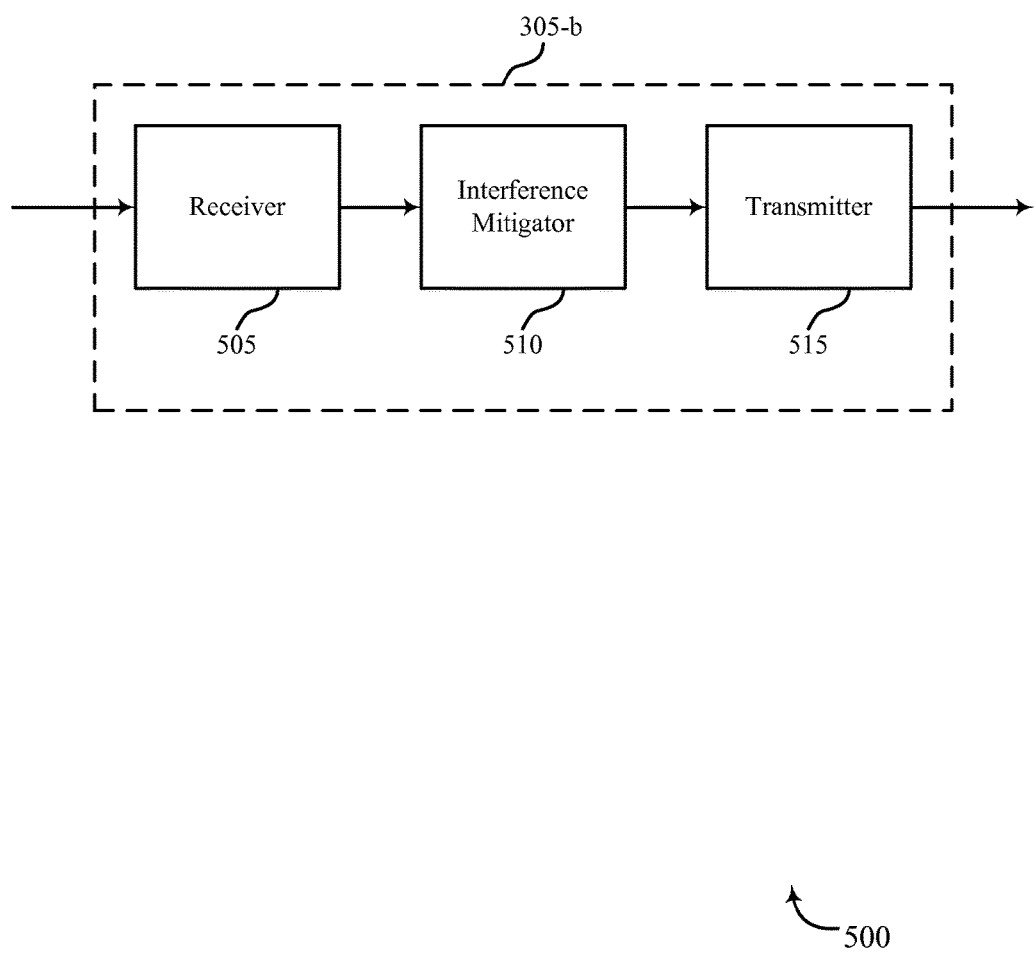
FIG. 5 shows a block diagram that illustrates an example of a resource-managing multi-radio device.

Referring now to FIG. 5, a block diagram 500 illustrates a device 305-*b* for use in interference detection in a multi-radio wireless terminal according to various embodiments. In some embodiments, the device 305-*b* may be an example of one or more aspects of the UEs 115 or APs 120 described with reference to FIGS. 1, 2, 3, and/or FIG. 4. The device 305-*b*, or portions of it, may also be a processor. The device 305-*b* may include a receiver 505, an interference mitigator 510, and/or a transmitter 515. Each of these components may be in communication with one another.

In some embodiments, the receiver 505 may be or include a radio frequency (RF) receiver. The RF receiver may include separate receivers for the different bands. For example, the RF receiver may include a receiver (i.e., part of a radio or modem) operable to receive transmissions in one or more WiFi bands (e.g., 2.4 GHz, 5 GHz). The RF receiver may also include a receiver operable to receive transmission in one or more LTE bands. The receiver 505 may be used to receive various types of data and control signals (e.g., transmissions) over communication links of a wireless communications system, including communication links of the cellular networks (e.g., LTE networks) and/or the WLAN or WiFi networks described with reference to the preceding figures.

In some examples, the transmitter 515 may be or include an RF transmitter. The RF transmitter may include separate transmitters for the different bands. For example, the RF transmitter may include a transmitter (e.g., part of a radio or modem) operable to transmit in WiFi bands (e.g., 2.4 GHz, 5 GHz). The RF transmitter may also include a transmitter operable to transmit in LTE bands. The transmitter 515 may be used to transmit various types of data and control signals over communication links of a wireless communications system, including communication links of the cellular networks (e.g., LTE networks) and/or the WLAN or WiFi networks described with reference to the preceding figures.

In some examples, the interference mitigator 510 is configured to detect an interference signal on the unlicensed or shared spectrum utilized by the LTE radio for LTE/LTE-A communications. The interference mitigator 510 may be integrated with either the LTE radio and/or the WLAN radio described with reference to FIG. 4. In some examples, the functionality of the interference mitigator 510 may be implemented as a sub-module of a processor of the device 305-b. The interference mitigator 510 may, for example, monitor the unlicensed or shared spectrum for interference signals using WiFi. Upon detection of the interference signal, the interference mitigator 510 may direct the WLAN radio to perform a spectrum analysis, including identifying the channels experiencing interference and determining the structure of the detected signal. The interference mitigator 510 may further report the detected interference and corresponding spectrum analysis to the LTE radio. In some examples, the LTE radio may modify its operations on the unlicensed spectrum based on the interference report received from the WLAN.

Figure 6:
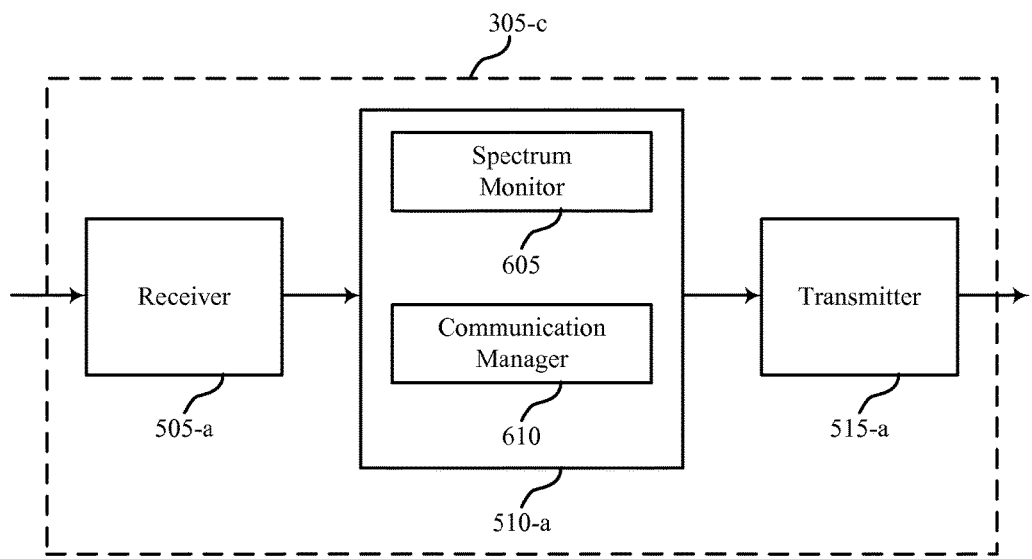
FIG. 6 shows a block diagram that illustrates an example of a resource-managing multi-radio device.

Referring now to FIG. 6, shows a block diagram 600 illustrating an example of a resource-managing multi-radio device 305-c. In some examples, the device 305-c may be an example of aspects of the UEs 115 or APs 120 described with reference to the preceding figures. The device 305-c, or portions of it, may also be a processor. The 305-c may include a receiver 505-a, an interference mitigator 510-a, and/or a transmitter 515-a. Each of these components may be in communication with one another.

The receiver 505-a and the transmitter 515-a may be examples of the receiver 505 and transmitter 515 described above with reference to FIG. 5, and they may perform substantially the same functions. The interference mitigator 510-a may be an example of the interference mitigator 510 of FIG. 5, and may include a spectrum monitor 605 and a communication manager 610. Each of these components may be in communication with one another.

The spectrum monitor 605 may be configured to monitor (e.g., scan) unlicensed or shared spectrum, and to identifying interference parameters that may indicate interference in the unlicensed or shared spectrum. Additionally or alternatively, the spectrum monitor 605 may be configured to analyze the detected interference signal to identify the interfering channels and the structure of the interfering signal.

The communication manager 610 may be configured to generate messages and interrupts between the WLAN radio and the LTE radio. The communication manager 610 may also be configured to modify operations of the LTE radio based on the detected interference signal. In some examples, the communication manager 610 may tune the LTE radio to avoid communicating on the interfering channels by utilizing Dynamic Frequency Selection (DFS). The DFS may identify priority signals operating in the unlicensed spectrum (e.g., 5 GHz band) and provide means for executing steps to avoid disturbance for priority signals in the unlicensed or shared spectrum. Such avoidance steps may include selecting an alternative channel to maintain LTE/LTE-A communications with the eNB in the shared spectrum and/or prevent transmission by the LTE radio on one or more channels of the shared spectrum identified by the WLAN radio as experiencing interference. In some examples, the interfering or priority signal may be caused by a radar signal or another network device communicating on the designated spectrum (e.g., LTE signal, WLAN signal, etc.).

Figure 7:
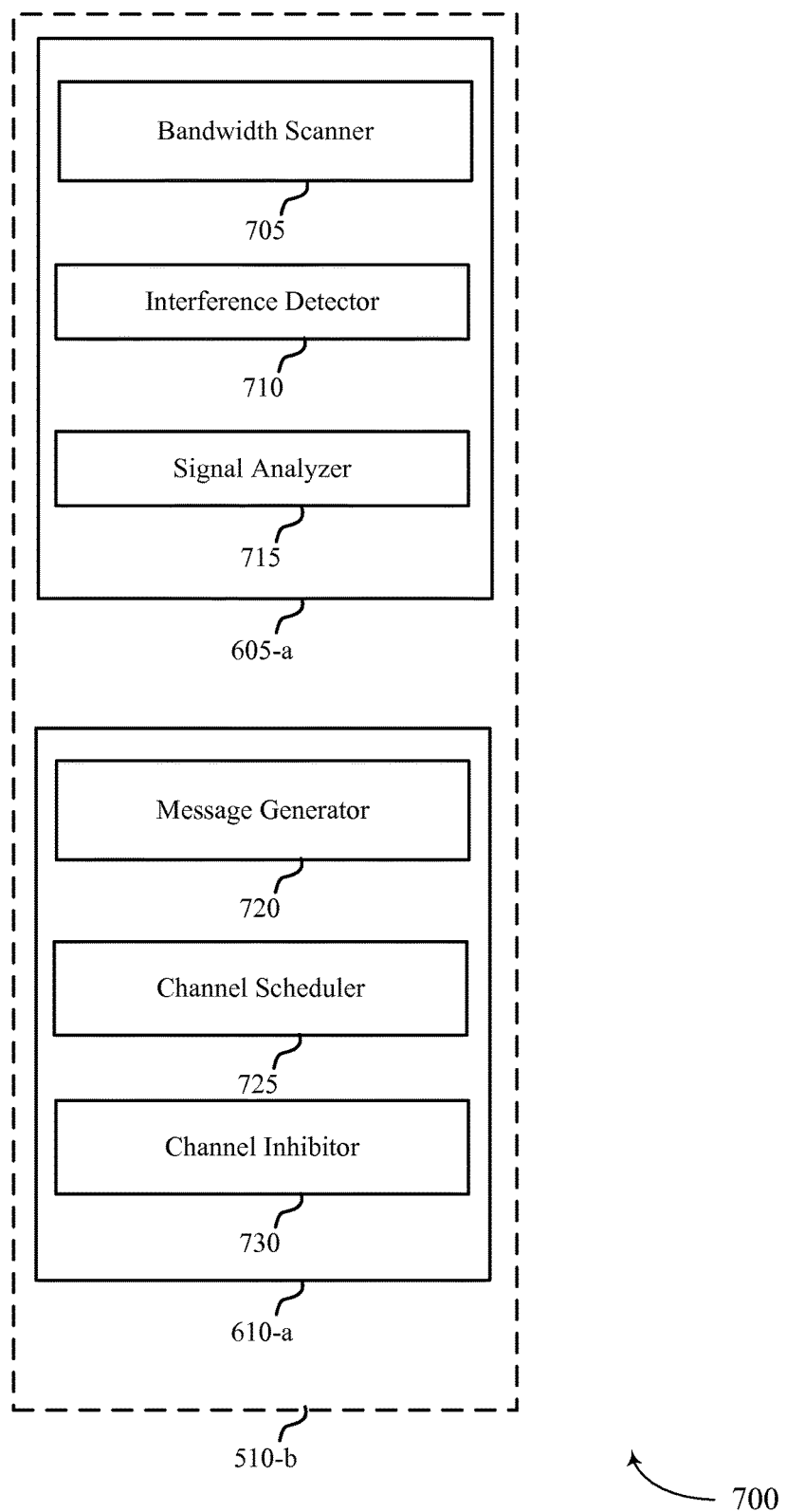
FIG. 7 shows a block diagram that illustrates an example of an interference mitigator of a resource-managing multi-radio device.

Referring now to FIG. 7, a block diagram 700 illustrates an example of an interference mitigator 510-b of a resource-managing multi-radio device 305. The interference mitigator 510-b may be an example of the interference mitigator 510 described with reference to FIGS. 5 and/or 6. The interference mitigator 510, or portions of it, may also be a processor. The interference mitigator 510 may include a spectrum monitor 605-a and communication manager 610-a, which may be examples of the spectrum monitor 605 and the communication manager 610 above with respect to FIG. 6. Each of these components may be in communication with one another.

The spectrum monitor 605-a may include a bandwidth scanner 705, interference detector 710, and a signal analyzer 715. The bandwidth scanner 705 may be configured to actively scan the frequencies of the unlicensed or shared spectrum for presence of interfering signals. The interfering signal may be, for example, signals commonly transmitted using the particular frequency spectrum (e.g., WiFi signals, radar signals, or LTE/LTE-A signals in an unlicensed or shared spectrum). Thus, the spectrum monitor 605-a may be configured to monitor signals received on carrier frequencies in the designated frequency spectrum.

The presence of interfering signals may be detected by the interference detector 710 based on the transmission characteristics and/or structure of the one or more signals modulated onto each of the received carrier frequencies. In some examples, the interference signal includes a WLAN signal, a radar signal, and/or an LTE/LTE-A signal modulated on the unlicensed spectrum by a remote device. A remote device may be other UEs, radars, base stations and/or access points. The interference detector 710, may be configured to, upon detecting interference on the unlicensed or shared spectrum, issue a request to the signal analyzer 715 for evaluation of the detected signal. In some examples, the signal analyzer 715 is configured to evaluate the detected signal to identify specific channels experiencing interference and a structure of the detected signal. The spectrum analysis may include determining the signal structure including duty cycle and spatial signature (e.g., single or multiple spatial streams). The signal analyzer 715 may further be configured to analyze a designated spectrum to identify alternate channels that may be used by the LTE radio to establish LTE/LTE-A communications in the unlicensed or shared spectrum.

In some examples, the communication manager 610-a includes a message generator 720, channel scheduler 725, and communication inhibitor 730. The message generator 720 may be utilized by the WLAN radio and the LTE radio to communicate with each other. In some examples, the message generator 720, in response to the WLAN radio detecting interference, is configured to generate and send a message or an interrupt to the LTE radio identifying the detected interference and requesting the LTE radio to modify its operations on the unlicensed or shared spectrum. Additionally or alternatively, the message generator 720 may be utilized to communicate with the receiver 505 and transmitter 515 as described with reference to FIGS. 5 and/or 6. Thus, in some examples, the message generator 720 may generate packets for transmission to the network utilizing LTE/LTE-A communication in the unlicensed or shared spectrum.

In some examples, the communication manager 610-a may utilize channel scheduler 725 and communication inhibitor 730 to modify the operations of the LTE-radio on the unlicensed or shared spectrum. The channel scheduler 725 may be configured to utilize DFS to tune the LTE radio to avoid communicating on the channel identified by the WLAN radio as experiencing interference (e.g., a channel occupied by a radar signal). In other examples, the channel scheduler 725 may dynamically switch operation of the LTE radio from unlicensed or shared spectrum to a licensed spectrum upon identification of an interfering signal on the shared spectrum. Additionally or alternatively, the communication inhibitor 730 may prevent transmission by the LTE radio on a channel of the designated spectrum based on the spectrum analysis.

The components of device 305 and/or interference mitigator 510-b of FIGS. 5, 6, and 7 may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

Figure 8:
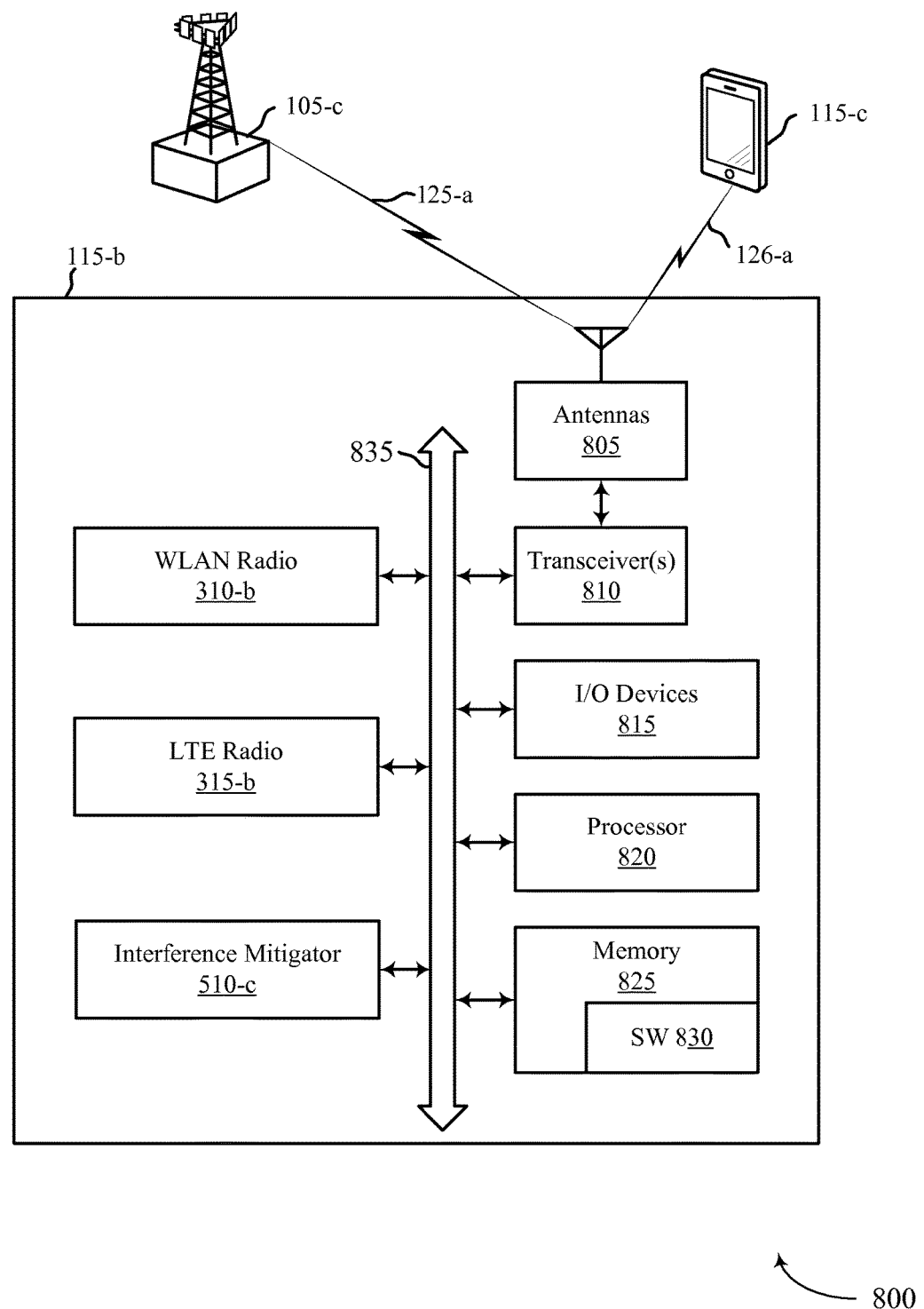
FIG. 8 shows a block diagram that illustrates an example of a system operating with a resource-managing multi-radio device.

FIG. 8 shows a block diagram 800 illustrating an example of a system operating with a resource-managing multi-radio device. The system may include an eNB 105-c and UEs 115-b and 115-c, which may each be example of corresponding devices with reference to the preceding figures.

The device 115-b may include antenna(s) 805, transceiver(s) 810, I/O devices 815, a processor 820, and a memory 825, which each may be in communication, directly or indirectly, with one another, for example, via bus 835. The transceiver 810 may be configured to communicate bi-directionally, via the antennas 805, with the eNB 105-c, APs 120 (not shown) and/or UE 115-c via communication links 125-a and 126-a. The transceiver 810 may include a modem configured to modulate the packets and provide the modulated packets to the antennas 805 for transmission, and to demodulate packets received from the antennas 805. The transceiver 810 may be configured to maintain multiple concurrent communication links using the same or different radio interfaces (e.g., WiFi, cellular, etc.). The device 115-b may include a single antenna 805 or multiple antennas 805. The device 115-b may be capable of employing multiple antennas 805 for transmitting and receiving communications in a multiple-input multiple-output (MIMO) communication system.

The device 115-b may also include a WLAN radio 305-b and an LTE radio 315-b, which may manage communications with other network devices, such as UE 115-c and base station 105-c as shown in FIG. 8, via the transceiver 810 and antennas 805. The wireless device 115-b may have any of various configurations. The device 115-b may, in some cases have an internal power supply, such as a small battery, to facilitate mobile operation.

The memory 825 may include random access memory (RAM) or read-only memory (ROM), or both. The memory 825 may store computer-readable, computer-executable software (SW) 830 containing instructions that are configured to, when executed, cause the processor 820 to perform various functions described herein. Alternatively, the computer-executable software 830 may not be directly executable by the processor 820 but may be configured to cause the device 115-b (e.g., when compiled and executed) to perform functions described herein. The processor 820 may include an intelligent hardware device, e.g., a central processing unit (CPU), a microcontroller, an application specific integrated circuit (ASIC), etc. In some examples, the memory 825 stores parameters associated with the power save modes and categories of data connections.

According to the architecture of FIG. 8, the UE 115-b further includes an interference mitigator 510-c. The interference mitigator 510-c may be an example of the interference mitigator 510 described above with reference to FIGS. 5-7, and it may implement the techniques describe above for detecting one or more interfering signals in a particular unlicensed frequency spectrum. The interference mitigator 510-c may further allow for one or more interference cancellation or interference suppression techniques to be applied, as described in reference to FIGS. 1-7. By way of example, these components of the wireless device 115-b may be in communication with some or all of the other components of the device 115-b via bus 835. Additionally or alternatively, functionality of these components may be implemented via the transceiver 810, as a computer program product stored in software (SW) 830, and/or as controller elements of the processor 820. In some examples, the interference mitigator 510-c may be implemented as sub-routines in memory 825/software 830, executed by the processor 820. In other cases, these components may be implemented as sub-modules in the processor 820 itself.

Figure 9:
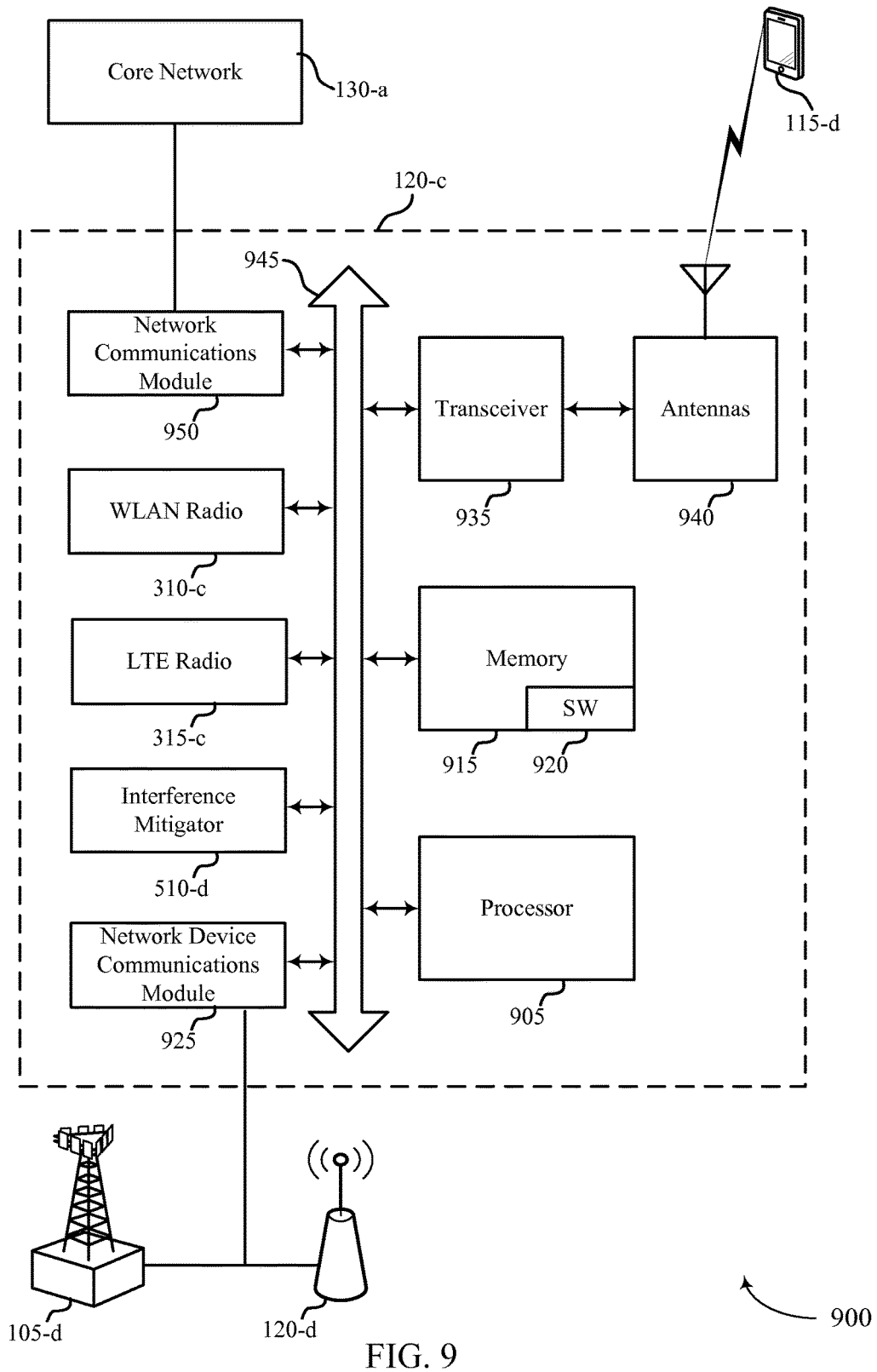
FIG. 9 shows a block diagram that illustrates an example of a system operating with a resource-managing multi-radio device.

FIG. 9 shows a diagram 900 that illustrates an example of a system operating with a resource-managing multi-radio device. The system 900 may include a base station 105-d, UE 115-d, APs 120, and a core network 130-a. Each of these devices may be examples of the corresponding devices described with reference to the preceding figures. The AP 120-c may include a processor 905, a memory 915, a transceiver 935, antennas 940, WLAN radio 310-c, LTE radio 315-c, and interference mitigator 510-d. The AP 120-c may also include one or both of a network device communications module 925 and a network communications module 950. The interference mitigator 510-d may be an example of similar modules in FIGS. 5-7. Each of these components may be in communication with one another, directly or indirectly, over one or more buses 1015.

The memory 915 may include RAM and ROM. The memory 915 may also store computer-readable, computer-executable software (SW) code 920 containing instructions that are configured to, when executed, cause the processor 905 to perform various functions described herein for managing resources in multi-radio device. Alternatively, the software code 920 may not be directly executable by the processor 905 but be configured to cause the computer, e.g., when compiled and executed, to perform functions described herein.

The processor 905 may include an intelligent hardware device, e.g., a CPU, a microcontroller, an ASIC, etc. The processor 905 may process information received through the transceiver 935, the network device communications module 925, and/or the network communications module 950. The processor 905 may also process information to be sent to the transceiver 935 for transmission through the antennas 940, to the network device communications module 925, and/or to the network communications module 950. The processor 905 may handle, alone or in connection with the interference mitigator 510-*d*, various aspects of efficiently managing multi-radio resources.

The transceiver 935 may include a modem configured to modulate the packets and provide the modulated packets to the antennas 940 for transmission, and to demodulate packets received from the antennas 940. The transceiver 935 may be implemented as one or more transmitters and one or more separate receivers. The transceiver 935 may support communications a free or open band (e.g., ISM or WiFi band). The transceiver 935 may be configured to communicate bi-directionally, via the antennas 940, with one or more associated wireless terminals or stations (STAs). The AP 120-*c* may include multiple antennas 940. The AP 120-*c* may communicate with a network through the network communications module 950. In some instances, the network may be part of a WLAN or WiFi network or may be in communication with the core network 130 of FIG. 1. The AP 120-*c* may communicate with other network devices, such as the APs 120-*d* and/or base stations 105-*d*, using the network device communications module 925, the transceiver 935, and/or the network communications module 950.

The interference mitigator 510-*d* may be configured to perform various aspects related to interference handling, including detecting interference in the unlicensed or shared spectrum, transmitting and receiving messages related to interference mitigation, and/or including the switching of operating channel to avoid priority signals or other cellular interference. Moreover, some or all of the functionality of the interference mitigator 510-*d* may be performed by the processor 905 and/or in connection with the processor 905.

Figure 10:
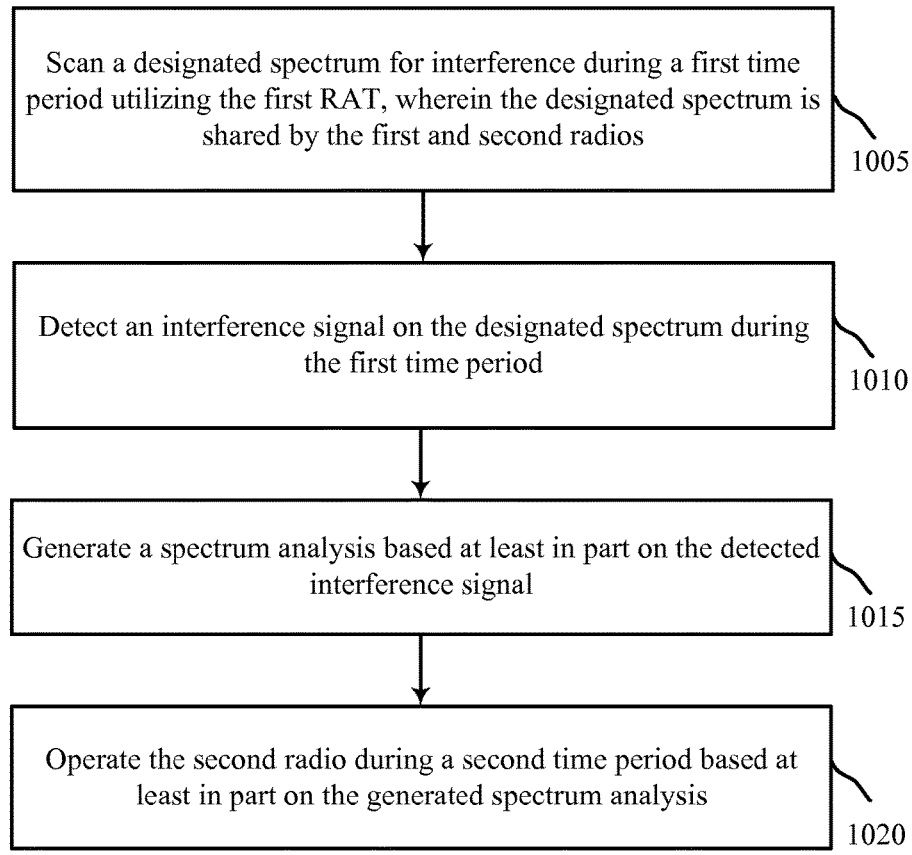
FIG. 10 shows a flowchart illustrating a method for wireless communications with a resource-managing multi-radio device.

FIG. 10 shows a flowchart illustrating a method 1000 for wireless communications with a resource-managing multi-radio device. For clarity, the method 1000 is described with reference to the wireless device 305 described with reference to FIGS. 3-8. In some examples, the wireless device 305 may be an aspect of a UE 115 and/or AP 120 described with reference to FIGS. 1 and 2. In some examples, the processor 820 described with reference to FIG. 8 may execute sets of codes to control the functional elements of a wireless device 115 to perform the functions described below. In other examples, the processor 905 described with reference to FIG. 9 may execute sets of codes to control the functional elements of a wireless device 115 to perform the functions described below At block 1005, the wireless device may scan a designated spectrum for interference during a first time period utilizing the first RAT. The designated spectrum may be shared by the first and second radios. In some examples, the first radio may be a WLAN radio and the second radio may be an LTE radio. The operation(s) of block 1005 may be performed by the bandwidth scanner described with reference to FIG. 7.

At block 1010, the method may include detecting an interference signal on the designated spectrum during the first time period. Detection of one or more interfering signals in a particular frequency spectrum may allow for one or more interference cancellation or interference suppression techniques to be applied, which may improve system performance. In some examples, the interference may be caused by a radar node, a neighboring eNB or Access Point transmitting over the unlicensed or shared spectrum using TDD communications. The operation(s) of block 1010 may be performed by the interference detector described with reference to FIG. 7.

At block 1015, the wireless device may generate a spectrum analysis based on the detected interference signal. The spectrum analysis may include identifying channels that observed interference and/or determining the structure of the interfering signal. In one example, the signal structure may include the duty cycle and spatial signature (i.e., single or multiple spatial streams) of the interfering signal. The operation(s) of block 1015 may be performed by the signal analyzer described with reference to FIG. 7.

At block 1020, the wireless device may modify the operation of the second radio during a second time period based on the generated spectrum analysis to mitigate the effects of interference. In some examples, the modifications may include one or both of avoiding designated channels and/or ceasing communication in the unlicensed or shared spectrum. The operation(s) of block 1020 may be performed by the communication manager described with reference to FIG. 6.

Figure 11:
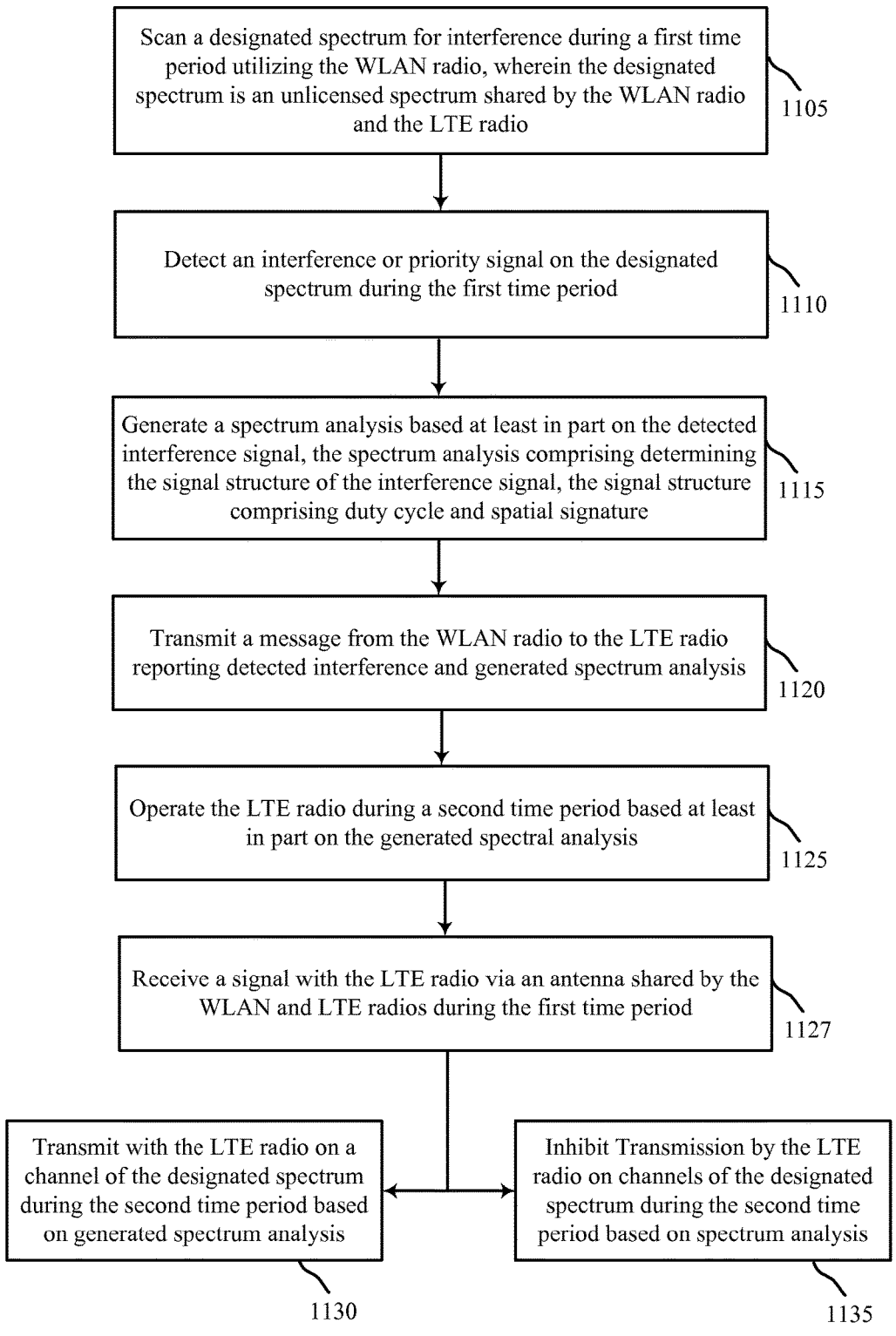
FIG. 11 shows a flowchart illustrating a method for wireless communications with a resource-managing multi-radio device.

FIG. 11 shows a flowchart illustrating a method 1100 for wireless communications with a resource-managing multi-radio device. For clarity, the method 1100 is described with reference to the wireless device 305 described with reference to FIGS. 3-8. In some examples, the wireless device 305 may be an aspect of a UE 115 and/or AP 120 described with reference to FIGS. 1 and 2. In some examples, the processor 820 described with reference to FIG. 8 may execute sets of codes to control the functional elements of a wireless device 115 to perform the functions described below. In other examples, the processor 905 described with reference to FIG. 9 may execute sets of codes to control the functional elements of a wireless device 115 to perform the functions described below At block 1105, the wireless device may scan a designated spectrum for interference during a first time period utilizing the WLAN radio, wherein the designated spectrum is an unlicensed spectrum shared by the WLAN radio and the LTE radio. The operation(s) of block 1105 may be performed by the bandwidth scanner described with reference to FIG. 7.

At block 1110, the method may include detecting an interference and/or priority signals on the designated spectrum during the first time period. Detection of one or more interfering signals in a particular frequency spectrum may allow for one or more interference cancellation or interference suppression techniques to be applied, which may improve system performance. In some examples, the interference may be caused by a radar node, a neighboring eNB or Access Point transmitting over the unlicensed or shared spectrum using TDD communications. The operation(s) of block 1110 may be performed by the interference detector described with reference to FIG. 7.

At block 1120, the wireless device may generate a spectrum analysis based on the detected interference signal. The spectrum analysis may include identifying channels that observed interference and/or determining the structure of the interfering signal. In one example, the signal structure may include the duty cycle and spatial signature (i.e., single or multiple spatial streams) of the interfering signal. The operation(s) of block 1115 may be performed by the signal analyzer described with reference to FIG. 7.

At block 1120, the wireless device may transmit a message from the WLAN radio to the LTE radio reporting detected interference and/or generated spectrum analysis. The operation(s) of block 1120 may be performed by the message generator 720 described with reference to FIG. 7.

At block 1125, the wireless device may modify the operation of the second radio during a second time period based on the generated spectrum analysis to mitigate the effects of interference. The operation(s) of block 1125 may be performed by the communication manager described with reference to FIG. 6.

At block 1127, the wireless device may receive a signal during, the first time period, with the second radio via an antenna shared by the first and second radios. The operation(s) of block 1127 may be performed by the receivers 505 described with reference to FIGS. 5 and 6.

In some examples, the modifications may include one or both of avoiding designated channels and/or ceasing communication in the unlicensed or shared spectrum. For instance, at block 1130, the wireless device may transmit with the LTE radio in the designated spectrum during the second time period based on generated spectrum analysis. Stated generally, the wireless device may schedule its transmission by tuning the LTE radio away from the channel experiencing interference. The operation(s) of block 1130 may be performed by the channel scheduled described with reference to FIG. 7.

Alternatively, in other examples, the modifications may include ceasing transmission on the unlicensed spectrum. For instance, at block 1135, the wireless device may inhibit transmission by the LTE radio on channels of the designated spectrum during the second time period based on spectrum analysis. The operation(s) of block 1135 may be performed by the channel inhibitor described with reference to FIG. 6.

The detailed description set forth above in connection with the appended drawings describes examples and does not represent the only embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another, including non-transitory computer-readable media. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the broadest scope consistent with the principles and novel features disclosed herein.

What is claimed is:

1. A method for wireless communication with a device comprising a first radio employing a first radio access technology (RAT) and a second radio employing a second RAT, the method comprising:
   scanning a designated spectrum for interference during a first time period utilizing the first RAT, wherein the designated spectrum is shared by the first and second radios;
   detecting an interference signal on the designated spectrum during the first time period;
   determining a duty cycle and a rank of the detected interference signal;
   controlling operation of the second radio during a second time period in order to mitigate an effect of the detected interference signal based at least in part on the determined duty cycle and rank of the detected interference signal; and
   inhibiting transmission by the second radio on a channel of the designated spectrum during the second time period based at least in part on the determined duty cycle and rank of the detected interference signal.

2. The method of claim 1, further comprising:
   receiving a signal with the second radio via an antenna shared by the first and second radios during the first time period.

3. The method of claim 1, further comprising transmitting with the second radio in the designated spectrum during the second time period in order to mitigate the effect of the detected interference signal based at least in part on the determined duty cycle and rank of the detected interference signal.

4. The method of claim 3, further comprising tuning the second radio to avoid communicating on the channel of the designated spectrum during the second time period.

5. The method of claim 1, further comprising:
   sending the determined duty cycle and rank of the detected interference signal from the first radio to the second utilizing a messaging interface.

6. The method of claim 1, wherein the first and second radios share a low-noise amplifier and an antenna.

7. The method of claim 1, wherein the interfering signal comprises at least one of a wireless local area network (WLAN) signal, a radar signal, or a Long-Term Evolution (LTE) signal.

8. The method of claim 1, wherein the designated spectrum comprises an unlicensed spectrum band.

9. The method of claim 1, wherein the first radio comprises a wireless local area network (WLAN) modem and the second radio comprises a Long-Term Evolution (LTE) modem operating in the designated spectrum.

10. An apparatus for wireless communication, comprising:
    a first radio employing a first radio access technology (RAT);
    a second radio employing a second RAT;
    a bandwidth scanner to scan a designated spectrum for interference during a first time period utilizing the first RAT, wherein the designated spectrum is shared by the first and second radios;
    an interference detector to detect an interference signal on the designated spectrum during the first time period;
    a signal analyzer to determine a duty cycle and a rank of the detected interference signal;
    a communication manager to control operation of the second radio during a second time period in order to mitigate an effect of the detected interference signal based at least in part on the determined duty cycle and rank of the detected interference signal; and
    a communication inhibitor to inhibit transmission by the second radio on a channel of the designated spectrum during the second time period based at least in part on the determined duty cycle and rank of the detected interference signal.

11. The apparatus of claim 10, further comprising:
    a receiver to receive a signal with the second radio via an antenna shared by the first and second radios during the first time period.

12. The apparatus of claim 10, further comprising:
    a transmitter to transmit with the second radio in the designated spectrum during the second time period in order to mitigate the effect of the detected interference signal based at least in part on the determined duty cycle and rank of the detected interference signal.

13. The apparatus of claim 12, further comprising:
    a channel scheduler to tune the second radio to avoid communicating on the channel of the designated spectrum during the second time period.

14. The apparatus of claim 10, further comprising:
    a transmitter to send the determined duty cycle and rank of the detected interference signal from the first radio to the second utilizing a messaging interface.

15. The apparatus of claim 10, further comprising:
    a common low-noise amplifier and an antenna for first and second radios.

16. The apparatus of claim 10, wherein the interfering signal comprises at least one of a wireless local area network (WLAN) signal, a radar signal, or an Long-Term Evolution (LTE) signal.

17. The apparatus of claim 10, wherein the designated spectrum comprises an unlicensed spectrum band.

18. The apparatus of claim 10, wherein the first radio comprises a wireless local area network (WLAN) modem and the second radio comprises a Long-Term Evolution (LTE) modem operating in the designated spectrum.

19. An apparatus for wireless communication, the apparatus comprising:
a first radio employing a first radio access technology (RAT);
a second radio employing a second RAT;
means for scanning a designated spectrum for interference during a first time period utilizing the first RAT, wherein the designated spectrum is shared by the first and second radios;
means for detecting an interference signal on the designated spectrum during the first time period;
means for determining a duty cycle and a rank of the detected interference signal;
means for controlling operation of the second radio during a second time period in order to mitigate an effect of the detected interference signal based at least in part on the determined duty cycle and rank of the detected interference signal; and
means for inhibiting transmission by the second radio on a channel of the designated spectrum during the second time period based at least in part on the determined duty cycle and rank of the detected interference signal.

20. The apparatus of claim 19, further comprising:
means for receiving a signal with the second radio via an antenna shared by the first and second radios during the first time period.

21. The apparatus of claim 19, further comprising:
means for transmitting with the second radio in the designated spectrum during the second time period in order to mitigate the effect of the detected interference signal based at least in part on the determined duty cycle and rank of the detected interference signal.

22. The apparatus of claim 21, further comprising:
means for tuning the second radio to avoid communicating on the channel of the designated spectrum during the second time period.

23. The apparatus of claim 19, further comprising:
means for sending the determined duty cycle and rank of the detected interference signal from the first radio to the second utilizing a messaging interface.

24. The apparatus of claim 19, wherein the first and second radios share a low-noise amplifier and an antenna.

25. The apparatus of claim 19, wherein the interfering signal comprises at least one of a WLAN signal, a radar signal, or an LTE signal.

26. The apparatus of claim 19, wherein the designated spectrum comprises an unlicensed spectrum band.

27. The apparatus of claim 19, wherein the first radio comprises a wireless local area network (WLAN) modem and the second radio.

28. A non-transitory computer-readable medium storing code for wireless communication with a device comprising a first radio employing a first radio access technology (RAT) and a second radio employing a second RAT, the code comprising instructions executable by a processor to:
scan a designated spectrum for interference during a first time period utilizing the first RAT, wherein the designated spectrum is shared by the first and second radios;
detect an interference signal on the designated spectrum during the first time period;
determine a duty cycle and a rank of the detected interference signal;
control operation of the second radio during a second time period in order to mitigate an effect of the detected interference signal based at least in part on the determined duty cycle and rank of the detected interference signal; and
inhibit transmission by the second radio on a channel of the designated spectrum during the second time period based at least in part on the determined duty cycle and rank of the detected interference signal.

29. The non-transitory computer-readable medium of claim 28, the instructions further causing the processor to:
receive a signal with the second radio via an antenna shared by the first and second radios during the first time period.

30. The non-transitory computer-readable medium of claim 28, the instructions further causing the processor to:
transmit with the second radio in the designated spectrum during the second time period in order to mitigate the effect of the detected interference signal based at least in part on the determined duty cycle and rank of the detected interference signal.

31. The non-transitory computer-readable medium of claim 30, the instructions further causing the processor to:
tune the second radio to avoid communicating on the channel of the designated spectrum during the second time period.

32. The non-transitory computer-readable medium of claim 28, instructions further causing the processor to:
send the determined duty cycle and rank of the detected interference signal from the first radio to the second utilizing a messaging interface.

33. The non-transitory computer-readable medium of claim 28, wherein the first and second radios share a low-noise amplifier and an antenna.

34. The non-transitory computer-readable medium of claim 28, wherein the interfering signal comprises at least one of a WLAN signal, a radar signal, or an LTE signal.

35. The non-transitory computer-readable medium of claim 28, wherein the designated spectrum comprises an unlicensed spectrum band.

36. The non-transitory computer-readable medium of claim 28, wherein the first radio comprises a wireless local area network (WLAN) modem and the second radio comprises a Long-Term Evolution (LTE) modem operating in the designated spectrum.

* * * * *